(12) United States Patent
Nakano et al.

(10) Patent No.: US 6,467,268 B2
(45) Date of Patent: Oct. 22, 2002

(54) BRAKE MASTER CYLINDER

(75) Inventors: Toshihiro Nakano, Chiryu; Kaoru Tsubouchi, Toyota; Akimoto Okada, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/756,658

(22) Filed: Jan. 10, 2001

(65) Prior Publication Data

US 2001/0025490 A1 Oct. 4, 2001

(30) Foreign Application Priority Data

Jan. 14, 2000 (JP) .......................... 2000-006821

(51) Int. Cl.$^7$ ................................................ B60T 11/16
(52) U.S. Cl. ............................................ 60/562; 60/584
(58) Field of Search ................................. 60/562, 584

(56) References Cited

FOREIGN PATENT DOCUMENTS

| DE | 100 56 479 A1 | 5/2001 |
| GB | 2320749 A * | 1/1998 |
| JP | 4-27060 | 5/1992 |
| JP | 10-29527 | 2/1998 |

* cited by examiner

Primary Examiner—Edward K. Look
Assistant Examiner—Thomas E. Lazo
(74) Attorney, Agent, or Firm—Burns, Doane, Swecker & Mathis, LLP

(57) ABSTRACT

A brake master cylinder which prevents a contact between a projection of a spring retainer and a stopper of a sleeve when a piston is suddenly retracted by an operation of a pressure applying device of a brake system or by an air relieving operation to offer a high reliability without deformation and damages of the spring retainer and the sleeve. A groove extended in axial direction is provided on the sleeve. A distance between a rear end surface of the groove and a radial projection of a first spring retainer when the brake is not applied corresponds to the total of a distance of a retracting distance of a second piston from the position defined by the non-braking operation to a position where a piston port and an opening of a reservoir communication conduit are overlapped and a predetermined additional distance.

15 Claims, 2 Drawing Sheets

BRAKE MASTER CYLINDER

Figure 1:
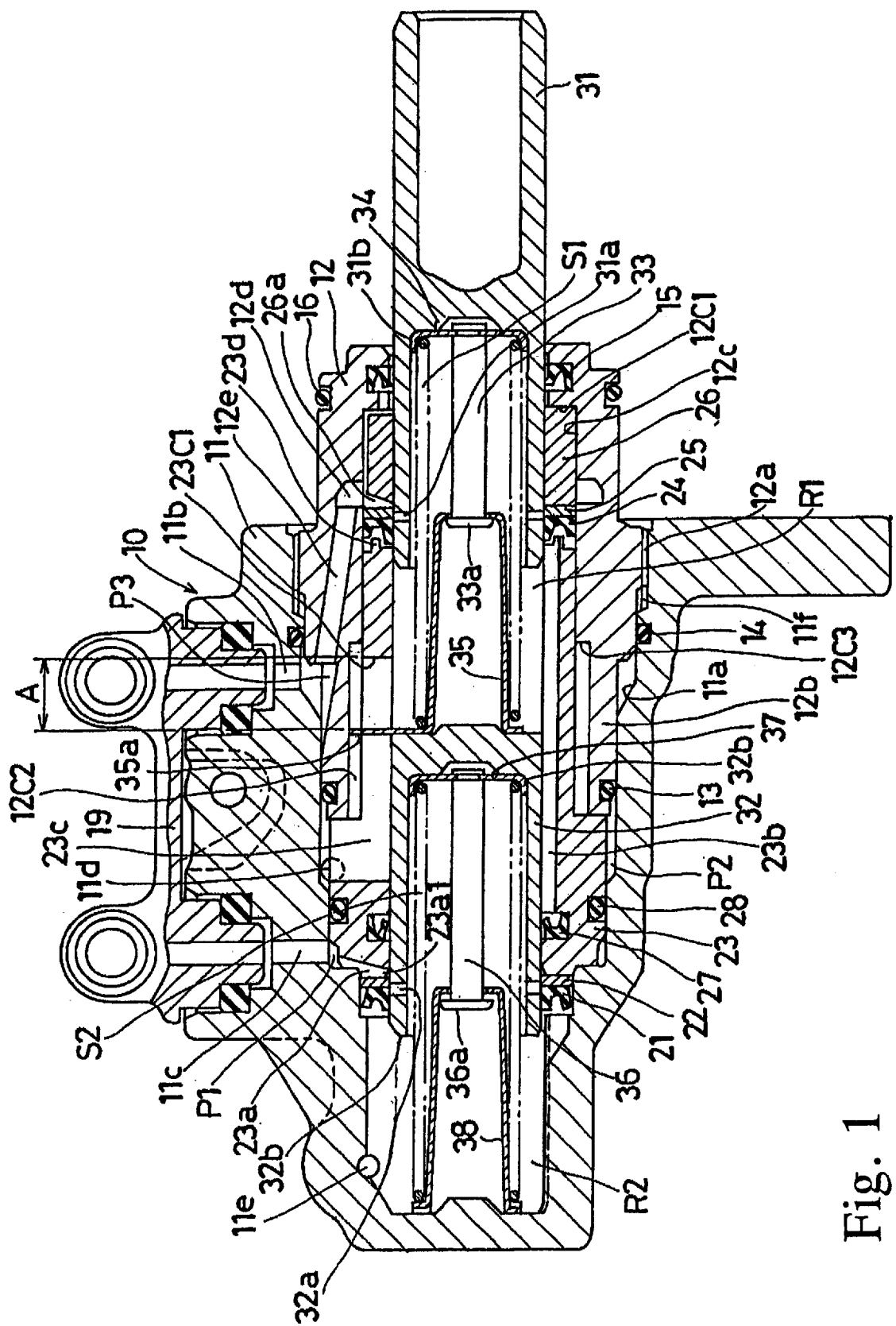

This application is based on and claims priority under 35 U.S.C. §119 with respect to Japanese Application No. 2000-006821 filed on Jan. 14, 2000, the entire content of which is incorporated herein by reference.

FIELD OF THE INVENTION

This invention generally relates to vehicle braking. More particularly, the present invention pertains to a brake master cylinder for a braking device of a vehicle.

BACKGROUND OF THE INVENTION

A known brake master cylinder device is described in Japanese Patent Publication 04-27060. The disclosed brake master cylinder includes a cylinder housing including a cap engaged with the opening of a body. A first piston and a second piston penetrate through the cap are slidably disposed via a piston guide in the cylinder housing. A resin made sleeve for determining the position of the first piston is slidably attached to the first piston and is disposed in the cylinder housing.

A first pressure chamber is formed with the first piston, the second piston, and the sleeve. A second pressure chamber is formed with the second piston and the inner wall of the body. The first pressure chamber and the second pressure chamber are provided with a spring mechanism for biasing the first piston and the second piston rearwardly.

In this known brake master cylinder, when the first piston and the second piston are slidably moved into the first pressure chamber and the second pressure chamber respectively by brake pedal depression, the fluid pressure in the respective pressure chambers is increased to convey the pressurized brake fluid from an output port to respective brake systems.

The spring mechanism comprises a return spring, a guide screw, and a spring retainer. The guide screw having a forwardly projecting head portion is engaged with the first piston. The spring retainer slidably moves on the guide screw and contacts the rear side of the head portion of the guide screw. The return spring is provided in a compressed state between the spring retainer and the first piston.

The spring retainer includes a projection protruding in the radially outward direction. The sleeve is provided with an axially extending guide groove for slidable engagement by the projection and a stopper blocking the axial movement of the projection of the spring retainer and restricting the retraction of the projection. This structure makes it possible to reduce the size of the brake master cylinder and to restrict the limitation for the retracted position of the first piston and the second piston.

The air relieving operation for relieving air remaining in the brake fluid is conducted when the brake device is assembled. The air relieving operation includes a so-called pumping operation for releasing bubbled air remaining in the brake fluid from a master cylinder reservoir to the atmosphere by strongly stepping on the brake pedal several times while injecting the brake fluid into the master cylinder reservoir. When air is still remaining in the brake fluid in the master cylinder, the first and the second pistons are rearwardly returned by an unnecessary strong force because the bubbled air compressed by the stepping operation of the brake pedal is expanded simultaneously with releasing of the brake pedal.

However, in this known brake master cylinder in which the position of the second piston is determined by the projection of the spring retainer contacting the stopper of the sleeve, the projection of the spring retainer and the stopper of the sleeve may be deformed or damaged by the severe contact between the projection of the spring retainer and the stopper of the sleeve when the aforementioned air relieving operation is conducted. In addition, because the final retracted position of the second piston when the brake pedal is released is determined based on the position that an opening of the piston port provided on the second piston overlaps with the back side of the cup seal, which is the position when the brake is not applied, bubbled air in the brake fluid may not be completely relieved to the atmosphere through the master cylinder reservoir.

In an electronic control brake system, the flow of brake fluid may be sometimes reversed into each pressure chamber of the master cylinder by a pump connected to a brake piping system. Particularly when the flow of the brake fluid is reversed into the second pressure chamber, the second piston is forced to be further moved in the rearward direction from the retracted position, which may deform and damage the projection of the spring retainer and the stopper of the sleeve.

In light of the foregoing, a need exists for a brake master cylinder which is not as susceptible to the same disadvantages and drawbacks as those discussed above.

A need also exists for a brake master cylinder having a relatively high degree of reliability in which deformation and damage will not occur by contact between a projection of a spring retainer and a stopper of a sleeve when a second piston is suddenly retracted by the operation of a pressure applying device of the brake system or by the air relieving operation.

SUMMARY OF THE INVENTION

The brake master cylinder of the present invention includes a cylinder housing formed by a body having an internal bore open at one end and a cylinder cap assembled to the internal bore at the opening end, a first piston positioned in the cylinder housing and slidably movable in the axial direction, and a second piston positioned forward of the first piston and slidably movable in the axial direction in the cylinder housing, and a sleeve located in the cylinder housing and slidably supporting the first piston and the second piston. The second piston is retractable by a predetermined distance from the non-braking operation position of the second piston.

Because the second piston is retractable by the predetermined distance from the non-braking operation position, any member which moves forward and rearward in one unit with the second piston does not contact the other fixed members under the air relieving operation. This thus prevents the movable and fixed members from deforming and becoming damaged.

A pressure chamber is formed between the second piston and the cylinder housing, a reservoir connecting port is formed in the body for connection to a reservoir, and a generally radially extending reservoir communication conduit is formed in the sleeve, opens to the outer diameter surface of the second piston, and establishes communication between the reservoir connecting port and the pressure chamber. A first cup seal is provided between the second piston and the body at a position forward of the sleeve, a second cup seal is provided between the sleeve and the second piston at a position rearward of the reservoir communication conduit, and a piston port is provided on the second piston at a position rearward of the first cup seal to establish communication between the reservoir communication conduit and the pressure chamber during non-braking operation. The predetermined distance corresponds to the total of the retracting distance of the second piston from the non-braking operation position to the position at which an opening of the piston port and an opening of the reservoir communication conduit overlap and a predetermined additional distance.

Thus, in accordance with the present invention, the second piston is retracted from the non-braking operation position to the position at which the opening of the piston port and the opening of the reservoir communication conduit overlap and is further retractable by the predetermined additional distance. Accordingly, fluid communication between the pressure chamber and the reservoir communication conduit is always ensured to completely relieve the bubbled air in the brake fluid to the atmosphere through the master cylinder reservoir.

The predetermined distance can also be defined by the retracting distance of the second piston from the non-braking operation position to the position at which the opening of the piston port and a lip of the second cylinder cup overlap. The second piston can thus be retracted from the non-braking operation position to the position at which the opening of the piston port and the lip of the second cup seal positioned rearward of the first cup seal overlap. Accordingly, this enables the retracting amount of the second piston to be predetermined to be considerably large to avoid the contact of any member moving forward and rearward as a unit with the second piston with other fixed members, thus preventing deformation and damage of the movable and fixed members.

Further, the predetermined distance can correspond to the total of the retracting distance of the second piston from the non-braking operation position to the position at which the front end surface of the second piston and the opening of the reservoir communication conduit overlap and another predetermined additional distance.

The brake master cylinder also includes a spring retainer having a flange portion at a front end portion thereof that contacts the rear end portion of the second piston, a rod having one end engageable with the spring retainer, a rod engaging member fixed to a bottom of an internal bore opening to the forward of the first piston with the other end of the rod being engaged with the rod engaging member, and a compressed spring provided between the spring retainer and the rod engaging member. The predetermined distance is equal to the moving distance of the radial projection provided on the flange portion from the rear end portion of the second piston to the rear end portion of an axial groove provided on the sleeve in axial direction, with the second piston being retractable by the predetermined distance. Because the predetermined distance is defined in this way, and because the axial groove extending in the axial direction can be easily formed when the sleeve is made by resin molding, a mechanism defining the retracting distance of the second piston can be provided without increasing the manufacturing cost. The mechanism defining the retracting distance of the second piston prevents the first piston and the second piston from dropping off from the cylinder housing during delivery and handling of the brake master cylinder.

The predetermined distance can be equal to the moving distance of the radial projection provided on the flange portion from the rear end of the second piston to a rear stepped portion of a large diameter portion provided on a stepped internal bore of the cylinder housing. Because the rear stepped portion of the large diameter portion can be easily formed when the cylinder housing is made by casting, a mechanism defining the retracting distance of the second piston can be provided without substantially increasing the cost. Also, the mechanism defining the retracting distance of the second piston prevents the first piston and the second piston from dropping off from the cylinder housing during delivery and handling of the brake master cylinder.

In accordance with another aspect of the invention, a brake master cylinder includes a cylinder housing having an internal bore open at one end, a cylinder cap assembled to the internal bore at the open end of the body, a first piston positioned in the cylinder housing and slidably movable in the axial direction, a second piston positioned in the cylinder housing forward of the first piston and slidably movable in the axial direction, a radially extending projection engaging a rear end portion of the second piston to move rearwardly with the second piston upon rearward movement of the second piston, and a sleeve positioned in the cylinder housing and slidably supporting the first piston and the second piston.

The radially extending projection extends into a groove formed in the sleeve, with the radially extending projection being spaced from a rear end wall of the groove by a predetermined distance to permit the radially extending projection to move rearwardly by the predetermined distance during non-braking operation without contacting the end wall of the groove.

In accordance with another aspect of the invention, a brake master cylinder includes a cylinder housing having an internal stepped bore open at one end, a larger diameter portion and a smaller diameter portion with a stepped portion located between the larger and smaller diameter portions, a cylinder cap assembled to the internal bore at the open end of the body, a first piston positioned in the cylinder housing and slidably movable in the axial direction, a second piston positioned in the cylinder housing forward of the first piston and slidably movable in the axial direction, and a sleeve positioned in the cylinder housing and slidably supporting the first piston and the second piston. The sleeve possess a groove. A radial projection engages a rear end portion of the second piston to move rearwardly with the second piston upon rearward movement of the second piston. The radial projection extends through the groove of the sleeve and into the larger diameter portion of the stepped bore of the cylinder housing. The radial projection is spaced from the rear end wall of the groove and from the stepped portion by at least a predetermined distance to permit the radial projection to move rearwardly by the predetermined distance during non-braking operation without contacting the end wall of the groove and without contacting the stepped portion.

BRIEF DESCRIPTION OF THE DRAWING FIGURES

Figure 2:
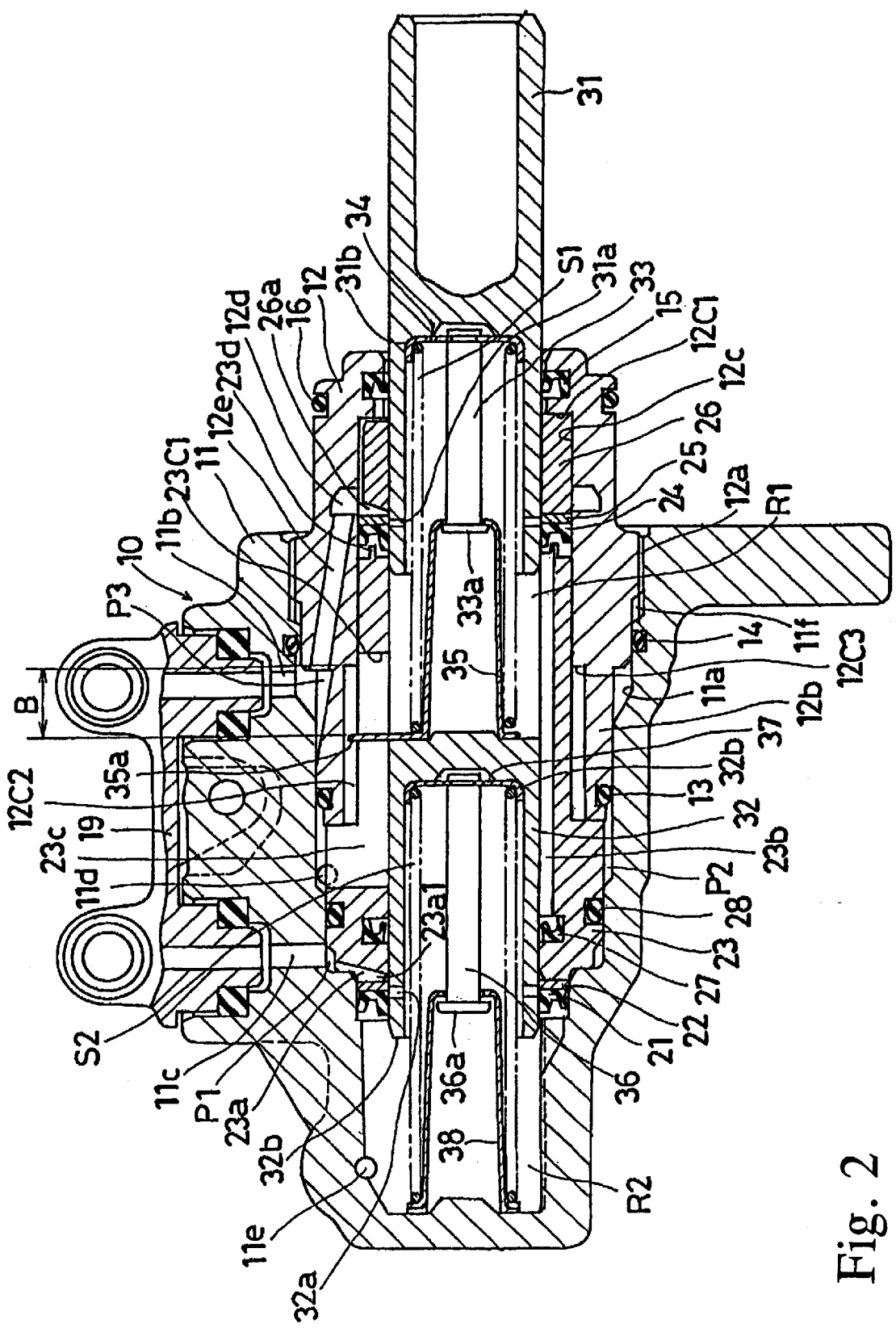

The foregoing and additional features and characteristics of the present invention will become more apparent from the following detailed description considered with reference to the accompanying drawing figures in which like reference numerals designate like elements and wherein:

FIG. 1 is a cross-sectional view of a brake master cylinder according to a first embodiment of the present invention; and FIG. 2 is a cross-sectional view of a brake master cylinder according to a second embodiment of the present invention.

DETAILED DESCRIPTION OF THE INVENTION

Several embodiments of a brake master cylinder according to the present invention are described below with reference to FIGS. 1 and 2. Referring initially to FIG. 1, the brake master cylinder according to a first embodiment is comprised of a cylinder housing 10 including a body 11 and a cylinder cap 12. The brake master cylinder also includes a first cup seal 21, a first spacer 22, a sleeve 23, a second cup seal 24, a second spacer 25, and a guide 26 which are disposed in the cylinder housing 10. The brake master cylinder further includes a first piston 31, and a second piston 32.

The body 11 is made of metal and includes a stepped internal bore 11a opening to the rear end (i.e., the right end of FIG. 1), reservoir connecting ports 11b, 11c connected to a reservoir (not shown) via a connector 19, and output ports 11d, 11e each connected to a wheel cylinder (not shown) via a respective hydraulic brake circuit. An internally screw threaded portion 11f is formed adjacent the opening end portion of the internal bore 11a. The first cup seal 21 and the first spacer 22 are disposed in the internal bore 11a of the body 11. The first cup seal 21 is positioned between the body 11 and the second piston 32 and seals in a liquid-tight manner a second pressure chamber R2 which communicates with the output port 11e. The annular first spacer 22 is positioned between the first cup seal 21 and the sleeve 23, and allows fluid flow in the axial direction at the inner and outer periphery. The first spacer 22 also prevents a part of the first cup seal 21 from cutting into or cutting off a reservoir communication conduit 23a of the sleeve 23 when pressure is generated at the second pressure chamber R2.

The cylinder cap 12 includes an external screw threaded portion 12a that threadably engages the internally screw threaded portion 11f of the body 11 at the middle portion of the outer periphery of the cylinder cap 12. The cylinder cap 12 also includes a cylindrical portion 12b that engages the internal bore 11a of the body 11 and accommodates a smaller diameter cylindrical portion of the sleeve 23. The cylinder cap 12 is assembled in a liquid-tight manner to the cylinder body 11 via a first O-ring 13 and a second O-ring 14. The cylinder cap 12 fastens the first cup seal 21, the first spacer 22 and the sleeve 23 at the end surface of the cylindrical portion 12b, and fastens the second cup seal 24, the second spacer 25 and the guide 26 at a right end stepped portion 12c1 of a stepped internal bore 12c of the cylinder cap 12.

The second annular spacer 25 is provided between the second cup seal 24 and the guide 26, and allows fluid flow in the axial direction at both the inner and outer peripheries while also preventing a part of the second cup seal 24 from cutting into or cutting off a second communication groove 26a of the guide 26 when pressure is generated in a first pressure chamber R1.

A third cup seal 15 is positioned at the inner periphery of the right end portion of the cylinder cap 12. A third O-ring 16 is positioned at the outer periphery of the right end portion of the cylinder cap 12. The first O-ring 13 assembled at the outer periphery of the left end portion of the cylinder cap 12 provides a liquid-tight seal between the body 11 and the cylinder cap 12. The second O-ring 14 is assembled to the inner periphery of the body 11 at a position rearward of or rightward of the O-ring 13, and provides a liquid-tight seal between the body 11 and the cylinder cap 12. The third cup seal 15 provides a liquid-tight seal between the inner periphery of the cylinder cap 12 and the outer periphery of the first piston 31, while the third O-ring 16 provides a liquid-tight seal between a brake booster (not shown) and the cylinder cap 12. The outer periphery of the rear end or right end of the cylinder cap 12 possesses a hexagonal shape. By rotating the hexagonal portion with an appropriately shaped tool, the cylinder cap 12 is capable of being assembled to and disassembled from the body 11.

The cylindrical sleeve 23 can be made of resin and has a stepped portion on its outer periphery. A fourth cup seal 27 is positioned on the inner periphery of the left end portion of the cylindrical sleeve 23 and a fourth O-ring 28 is positioned on the outer periphery of the left end portion of the cylindrical sleeve 23.

The sleeve 23 is disposed between and supported by the internal bore stepped portion of the body 11 and the end surface of the cylindrical portion 12b of the cylinder cap 12. The fourth cup seal 27 provides a liquid-tight seal between the sleeve 23 and the second piston 32, and the fourth O-ring 28 provides a liquid-tight seal between the sleeve 23 and the body 11.

The sleeve 23 is provided with the reservoir communication conduit 23a, a first communication groove 23b, a groove 23c, and a projection 23d. A plurality of reservoir communication conduits 23a formed in an inclined manner towards the large diameter left end portion of the sleeve 23 and provided at a predetermined interval in the peripheral direction are always in communication with a reservoir connecting port 11c via an annular conduit P1 formed between the body 11 and the sleeve 23. The reservoir communication conduits 23a are also in communication with a piston port 32a provided on the second piston 32 via a gap between the first spacer 22 and the second piston 32.

A plurality of communication grooves 23b positioned at a predetermined interval in the peripheral direction and extending straight along the axial direction on the inner periphery of the sleeve 23 are provided for effecting communication between the first pressure chamber R1 formed between the first piston 31 and the second piston 32 and a recess portions of the second cup seal 24 and the fourth cup seal 27.

The groove 23c is formed along or includes a small diameter cylindrical portion and a large diameter cylindrical portion. The groove 23c extends in the axial direction and opens towards the radial direction to always connect the first pressure chamber R1 with the output port 11d. The rear end portion 23c1 of the groove 23c functions as a stopper that restricts the retracting distance of the first piston 31 and the second piston 32 when a radial projection 35a provided on a flange portion of a spring retainer 35 contacts the rear end portion 23c1 of the groove 23c.

The projection 23d is formed on the small diameter right end portion of the sleeve 23 and projects in the axial direction. The projection 23d is inserted into the cup-shaped recess portion of the second cup seal 24.

The cylindrical guide 26 can be made of resin and is assembled in the internal bore 12c of the cylinder cap 12. The cylindrical guide 26 is provided with the second communication groove 26a extending along the outer periphery of the cylindrical guide 26 to both ends of the cylindrical guide 26. A plurality of communication grooves 26a formed along the outer periphery of the guide 26 in axial direction and possessing a U-shape along the both ends of the guide in the radial direction are provided at a predetermined interval and forms a first communication conduit adjacent the back surface of the second cup seal with the second spacer 25.

The second communication groove 26a is always in communication with the reservoir connecting port 11b via a second communication conduit that includes an annular groove 12d provided on the front end portion of the cylinder cap 12 and a communication bore 12e (a plurality of such bores are provided at a predetermined interval in the peripheral direction) and via an annular conduit P3 formed between the body 11 and the cylinder cap 12. The second communication groove 26a is always in communication with a piston port 31a provided on the first piston 31 through a gap between the second spacer 25 and the first piston 31 and is always in communication with the cup-shaped recess portion of the cup seal through a gap between the cylinder cap 12 and the first piston 31 at the rear end portion of the guide 26.

The annular groove 12d provided on the cylinder cap 12 possesses a diameter larger than that of the second cup seal 24 and is formed rearwardly adjacent the second cup seal 24. The annular groove 12d is tapered in such a manner that the diameter of the outer peripheral wall gradually increases from the rear to the front and opens towards the inner periphery of the cylinder cap 12 to communicate with the communication groove 26a of the guide 26. The communication bore 12e extending from the outer periphery of the cylinder cap 12 through the front outer peripheral portion of the annular groove 12d communicates the annular groove 12d with the annular conduit P3 and is inclined upwardly towards the annular conduit P3. The structure of the communication bore 12e is effective for positioning the reservoir connecting port 11b at the forward position of the guide 26, thus improving the assembly of the brake master cylinder to the vehicle body.

The first piston 31 can be made of metal is inserted into the cylinder housing 10 through the cylinder cap 12 and is slidably supported in the axial direction by the sleeve 23 and the guide 26.

The first rod 33 can be made of metal and is assembled in one unit to the first piston 31 via the first retainer 34 and moves the in axial direction as one unit with the first piston 31. The first retainer 34 can be made of metal and also serves as a spring retainer of the first spring S1 to be fixedly engaged with the right end portion of the first rod 33. The first retainer 34 is fitted into the internal bore stepped portion 31b of the piston 31 by press fit.

The first spring retainer 35 can be made of metal and is positioned between the first spring S1 and the second piston 32. The right end of the first spring retainer 35 is detachably connected in the left direction to a head portion 33a at the left end of the first rod 33. The left end of the retainer 35 includes a radial projection 35a extending radially outwardly. The radial projection 35a extends to the large diameter portion 12c2 of the stepped internal bore 12c of the cylinder cap 12 through the groove 23c provided on the sleeve 23.

The first spring S1 is disposed in compression to have a predetermined attaching height or length by virtue of the first retainer 34 fixedly engaged with the first piston 31, the first rod 33 fixedly engaged with the first retainer 34, and the first spring retainer 35 connected to the first rod 33.

The second piston 32 can be made of metal and is positioned coaxially with respect to the first piston 31. The second piston 32 is slidably supported in the axial direction by the sleeve 23 in the cylinder housing 10.

The second rod 36 can be made of metal and is assembled to the second piston 32 via the second retainer 37 to form one unit. The second retainer 37 is positioned at the right end portion of the second rod 36, and the second rod 36 moves in the axial direction as a unit with the second piston 32. The second retainer 37 can be made of metal and also serves as a spring retainer of the second spring S2. The second retainer 37 is fixedly engaged with the right end portion of the second rod 36 and is fitted into the internal stepped portion 32b of the second piston 32 by press fit.

A second spring retainer 38 which can be made of metal is provided between the second spring S2 and the body 11, and is detachably connected in the left direction to a head portion 36a of the second rod 36 at right end portion of the second spring retainer 38.

In the embodiment of the present invention described above, when the brake master cylinder is assembled to the vehicle and brake fluid is filled in the cylinder housing 10 to move the first piston 31 in the axial direction (i.e., to the left in FIG. 1), the piston port 31a of the first piston 31 passes through the second cup seal 24, and communication between the first pressure chamber R1 and the reservoir connecting port 11b is blocked to generate pressure in the first pressure chamber R1.

The second piston 32 thus moves in the axial direction to the left in FIG. 1 and the piston port 32a of the second piston 32 passes through the first cup seal 21 to block communication between the second pressure chamber R2 and the reservoir connecting port 11c, and pressure is generated in the second pressure chamber R2. Accordingly, pressurized fluid moves from the first pressure chamber R1 to the output port 11d (the port connected to the wheel cylinder) and from the second pressure chamber R2 to the output port 11e (the port connected to the wheel cylinder) to provide the braking effect on each wheel cylinder.

The air relieving operation relieving remaining air in the brake fluid is conducted after assembling the brake master cylinder to the vehicle and before filling the brake fluid in the cylinder housing. The air relieving operation includes so-called pumping operation for relieving bubbled air remaining in the brake fluid from a master cylinder reservoir to the atmosphere by repeatedly stepping on and releasing the brake pedal while injecting brake fluid into the master cylinder reservoir. When the air is not relieved completely, the first and second pistons are rearwardly returned by an unnecessarily strong force since the bubbled air compressed by stepping on the brake pedal is expanded simultaneously with the release of the brake pedal.

According to this version of the present invention shown in FIG. 1, by constructing the brake master cylinder so that a predetermined distance or interval exists between the radial projection 35a of the first spring retainer 35 and the rear end surface 23c1 of the groove 23c of the sleeve 23 (i.e., the dimension A in FIG. 1), even when the second piston is returned in the rearward direction with a strong force by the expansion of the bubbled air, the radial projection 35a of the first spring retainer 35 does not contact the rear end surface 23c1 of the groove 23c of the sleeve 23 (i.e., the portion of the sleeve 23 forming the rearward wall of the groove 23c). This advantageously prevents deformation and damage of the first spring retainer 35 and the sleeve 23.

The predetermined distance A can be defined by the total of the retracting distance of the second piston 32 from the non-braking operation position to the position where then piston port 32a and the opening 23a1 of the reservoir communication conduit 23a overlap one another and a predetermined additional distance, thus facilitating prevention of contact between the radial projection 35a of the first spring retainer 35 and the rear end surface 23c1 of the groove 23c of the sleeve 23 (i.e., the portion of the sleeve 23 forming the rearward wall of the groove 23c). Further, because the piston port 32a can overlap with the opening 23a1 when the second piston 32 is retracted, sufficient passage space for relieving bubbled air to the reservoir is ensured.

The predetermined distance A can also be defined by the retracting distance of the second piston 32 from the non-braking operation position to the position where the piston port 32a and the lip of the fourth cup seal 27 overlap one another so that contact between the radial projection 35a of the first spring retainer 35 and the rear end surface 23c1 of the groove 23 of the sleeve 23 can be prevented. Further because the piston port 32a can overlap with the opening 23a1 when the second piston 32 is retracted, sufficient passage space for relieving bubbled air to the reservoir is ensured.

The predetermined distance A can also be defined by the total of the retracting distance of the second piston 32 from the non-braking operation position to the position where the front end surface 32b of the second piston 32 and the opening 23a1 of the reservoir communication conduit 23a overlap one another and a predetermined additional distance so that contact between the radial projection 35a of the first spring retainer 35 and the rear end surface 23c1 of the groove 23c of the sleeve 23 (i.e., the portion of the sleeve 23 forming the rearward wall of the groove 23c) can be prevented. In addition, because the piston port 32a can overlap with the opening 23a1 when the second piston 32 is retracted, sufficient passage space for relieving bubbled air to the reservoir is ensured.

In accordance with a second embodiment of the brake master cylinder of the present invention shown in FIG. 2, advantages and results similar to those associated with the first embodiment can be realized by providing a predetermined interval or distance between the radial projection 35a of the first spring retainer 35 and a stepped portion 12c3 of the large diameter portion 12c2 provided on the stepped internal bore 12c of the cylinder cap 12 (i.e., the interval or distance B shown in FIG. 2). Accordingly, the distance or interval B can be determined between the radial projection 35a of the first spring retainer 35 and the rear end surface 23c1 of the groove 23c of the sleeve 23 (i.e., the portion of the sleeve 23 forming the rearward wall of the groove 23c) as well as between the radial projection 35a of the first spring retainer 35 and the stepped portion 12c3 of the large diameter portion 12c2 provided on the stepped internal bore 12c of the cylinder cap 12. This further improves the flexibility in design construction of the brake master cylinder.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake master cylinder comprising:
a cylinder housing formed by a body having an internal bore open at one end;
a cylinder cap assembled to the internal bore at the open end of the body;
a first piston positioned in the cylinder housing and slidably movable in an axial direction;
a second piston positioned in the cylinder housing forwardly of the first piston and slidably movable in the axial direction; and
a sleeve positioned in the cylinder housing and slidably supporting the first piston and the second piston, the second piston being retractable by a predetermined distance from a non-braking operation position of the second piston
a pressure chamber formed between the second piston and the cylinder housing;
a reservoir connecting port formed on the body and adapted to communicate with a reservoir;
a reservoir communication conduit formed on the sleeve and extending at least partially in a radial direction, the reservoir communication conduit opening to an outer peripheral surface of the second piston to establish communication between the reservoir connecting port and the pressure chamber;
a first cup seal positioned between the second piston and the body and located forward of the sleeve;
a second cup seal positioned between the sleeve and the second piston and located rearward of the reservoir communication conduit;
a piston port provided on the second piston, the piston port being positioned rearwardly of the first cup seal and establishing communication between the reservoir communication conduit and the pressure chamber during non-braking operation, the predetermined distance being defined by the total of a retracting distance of the second piston from the non-braking operation position to a position where an opening of the piston port and an opening of the reservoir communication conduit overlap one another and a predetermined additional distance;
a spring retainer having a flange portion at a front end portion of the spring retainer, the flange portion contacting a rear end portion of the second piston;
a rod having one end engageable with the spring retainer;
a rod engaging member fixed to a bottom of an internal bore opening formed at a forward portion of the first piston, an end of the rod opposite the one end being engaged with the rod engaging member;
a compressed spring positioned between the spring retainer and the rod engaging member; and
the predetermined distance being equal to a moving distance of a radial projection provided on the flange portion from the rear end portion of the second piston to a rear stepped portion of a large diameter portion provided on a stepped internal bore of the cylinder housing.

2. A brake master cylinder comprising:
a cylinder housing formed by a body having an internal bore open at one end;
a cylinder cap assembled to the internal bore at the open end of the body;
a first piston positioned in the cylinder housing and slidably movable in an axial direction;
a second piston positioned in the cylinder housing forwardly of the first piston and slidably movable in the axial direction;
a sleeve positioned in the cylinder housing and slidably supporting the first piston and the second piston, the second piston being retractable by a predetermined distance from a non-braking operation position of the second piston;
a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal positioned between the second piston and the body and located forward of the sleeve;

a second cup seal positioned between the sleeve and the second piston and located at the rear of the reservoir communication conduit;

a piston port provided on the second piston, the piston port being positioned rearward of the first cup seal and establishing communication between the reservoir communication conduit and the pressure chamber during non-braking operation; and the predetermined distance corresponding to a retracting distance of the second piston from non-braking operation position to a position where an opening of the piston port and a lip of the second cup seal overlap one another.

3. A brake master cylinder comprising:

a cylinder housing formed by a body having an internal bore open at one end;

a cylinder cap assembled to the internal bore at the open end of the body;

a first piston positioned in the cylinder housing and slidably movable in an axial direction;

a second piston positioned in the cylinder housing forwardly of the first piston and slidably movable in the axial direction;

a sleeve positioned in the cylinder housing and slidably supporting the first piston and the second piston, the second piston being retractable by a predetermined distance from a non-braking operation position of the second piston;

a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal provided between the second piston and the body and located in front of the sleeve;

a second cup seal provided between the sleeve and the second piston and located rearward of the reservoir communication conduit;

a piston port provided on the second piston, the piston port being positioned rearward of the first cup seal and establishing communication between the reservoir cup communication conduit and the pressure chamber during non-application of the brake; and the predetermined distance being the total of a retracting distance of the second piston from the non-braking operation position to a position where a front end surface of the second piston and an opening of the reservoir communication conduit overlap one another and a predetermined additional distance.

4. A brake master cylinder comprising:

a cylinder housing having an internal bore open at one end;

a cylinder cap assembled to the internal bore at the open end of the body;

a first piston positioned in the cylinder housing and slidably movable in an axial direction;

a second piston positioned in the cylinder housing forward of the first piston and slidably movable in the axial direction;

a radially extending projection engaging a rear end portion of the second piston to move rearwardly with the second piston upon rearward movement of the second piston;

a sleeve positioned in the cylinder housing and slidably supporting the first piston and the second piston, the radially extending projection extending into a groove formed in the sleeve, the radially extending projection being spaced from a rear end wall of the groove by a predetermined distance to permit the radially extending projection to move rearwardly by the predetermined distance during non-braking operation without contacting the end wall of the groove.

5. The brake master cylinder according to claim 4, further comprising:

a pressure chamber formed between the second piston and the cylinder housing;

a reservoir connecting port formed on the body and adapted to communicate with a reservoir;

a reservoir communication conduit formed on the sleeve and extending at least partially in a radial direction, the reservoir communication conduit opening to an outer peripheral surface of the second piston to establish communication between the reservoir connecting port and the pressure chamber;

a first cup seal positioned between the second piston and the body and located forward of the sleeve;

a second cup seal positioned between the sleeve and the second piston and located rearward of the reservoir communication conduit; and a piston port provided on the second piston, the piston port being positioned rearwardly of the first cup seal and establishing communication between the reservoir communication conduit and the pressure chamber during non-braking operation, the predetermined distance being defined by the total of a retracting distance of the second piston from the non-braking operation position to a position where an opening of the piston port and an opening of the reservoir communication conduit overlap one another and a predetermined additional distance.

6. The brake master cylinder according to claim 4, further comprising:

a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal positioned between the second piston and the body and located forward of the sleeve;

a second cup seal positioned between the sleeve and the second piston and located at the rear of the reservoir communication conduit;

a piston port provided on the second piston, the piston port being positioned rearward of the first cup seal and establishing communication between the reservoir communication conduit and the pressure chamber during non-braking operation; and the predetermined distance corresponding to a retracting distance of the second piston from non-braking operation position to a position where an opening of the piston port and a lip of the second cup seal overlap one another.

7. The brake master cylinder according to claim 4, further comprising:

a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal provided between the second piston and the body and located in front of the sleeve;

a second cup seal provided between the sleeve and the second piston and located rearward of the reservoir communication conduit;

a piston port provided on the second piston, the piston port being positioned rearward of the first cup seal and establishing communication between the reservoir cup communication conduit and the pressure chamber during non-application of the brake; and the predetermined distance being the total of a retracting distance of the second piston from the non-braking operation position to a position where a front end surface of the second piston and an opening of the reservoir communication conduit overlap one another and a predetermined additional distance.

8. The brake master cylinder according to claim 4, further comprising:

a spring retainer, the radially extending projection extending from a front end portion of the spring retainer, the radially extending projection contacting a rear end portion of the second piston;

a rod having one end engageable with the spring retainer;

a rod engaging member fixed to a bottom of an internal bore opening formed at a forward portion of the first piston, the rod engaging member being engaged with an end of the rod that is opposite the one end;

a compressed spring positioned between the spring retainer and the rod engaging member; and the predetermined distance being equal to an axial moving distance of the radially extending projection from the rear end portion of the second piston to a rear end portion of the groove provided on the sleeve.

9. The brake master cylinder according to claim 4, further comprising:

a spring retainer having a front end portion at which is located the radially extending projection, the radially extending projection contacting a rear end portion of the second piston;

a rod having one end engageable with the spring retainer;

a rod engaging member fixed to a bottom of an internal bore opening formed at a forward portion of the first piston, an end of the rod opposite the one end being engaged with the rod engaging member;

a compressed spring positioned between the spring retainer and the rod engaging member; and the predetermined distance being equal to a moving distance of the radially extending projection from the rear end portion of the second piston to a rear stepped portion of a large diameter portion provided on a stepped internal bore of the cylinder housing.

10. A brake master cylinder comprising:

a cylinder housing having an internal stepped bore open at one end, the stepped internal bore having a larger diameter portion and a smaller diameter portion with a stepped portion located between the larger and smaller diameter portions;

a cylinder cap assembled to the internal bore at the open end of the body;

a first piston positioned in the cylinder housing and slidably movable in an axial direction;

a second piston positioned in the cylinder housing forward of the first piston and slidably movable in the axial direction;

a sleeve positioned in the cylinder housing and slidably supporting the first piston and the second piston, the sleeve having a groove;

a radial projection engaging a rear end portion of the second piston to move rearwardly with the second piston upon rearward movement of the second piston, the radial projection extending through the groove of the sleeve and into the larger diameter portion of the stepped bore of the cylinder housing, the radial projection being spaced from a rear end wall of the groove and from the stepped portion by at least a predetermined distance to permit the radial projection to move rearwardly by the predetermined distance during non-braking operation without contacting the end wall of the groove and without contacting the stepped portion.

11. The brake master cylinder according to claim 10, further comprising:

a pressure chamber formed between the second piston and the cylinder housing;

a reservoir connecting port formed on the body and adapted to communicate with a reservoir;

a reservoir communication conduit formed on the sleeve and extending at least partially in a radial direction, the reservoir communication conduit opening to an outer peripheral surface of the second piston to establish communication between the reservoir connecting port and the pressure chamber;

a first cup seal positioned between the second piston and the body and located forward of the sleeve;

a second cup seal positioned between the sleeve and the second piston and located rearward of the reservoir communication conduit; and a piston port provided on the second piston, the piston port being positioned rearwardly of the first cup seal and establishing communication between the reservoir communication conduit and the pressure chamber during non-braking operation, the predetermined distance being defined by the total of a retracting distance of the second piston from the non-braking operation position to a position where an opening of the piston port and an opening of the reservoir communication conduit overlap one another and a predetermined additional distance.

12. The brake master cylinder according to claim 10, further comprising:

a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal positioned between the second piston and the body and located forward of the sleeve;

a second cup seal positioned between the sleeve and the second piston and located at the rear of the reservoir communication conduit;

a piston port provided on the second piston, the piston port being positioned rearward of the first cup seal and establishing communication between the reservoir communication conduit and the pressure chamber during non-braking operation; and the predetermined distance corresponding to a retracting distance of the second piston from non-braking operation position to a position where an opening of the piston port and a lip of the second cup seal overlap one another.

13. The brake master cylinder according to claim 10, further comprising:

a pressure chamber formed between the second piston and the cylinder housing;

a reservoir connecting port formed on the body and adapted to be connected to a reservoir;

a reservoir communication conduit formed on the sleeve and extending at least partially in a radial direction, the reservoir communication conduit opening to an outer peripheral surface of the second piston and establishing communication between the reservoir connecting port and the pressure chamber;

a first cup seal provided between the second piston and the body and located in front of the sleeve;

a second cup seal provided between the sleeve and the second piston and located rearward of the reservoir communication conduit;

a piston port provided on the second piston, the piston port being positioned rearward of the first cup seal and establishing communication between the reservoir cup communication conduit and the pressure chamber during non-application of the brake; and the predetermined distance being the total of a retracting distance of the second piston from the non-braking operation position to a position where a front end surface of the second piston and an opening of the reservoir communication conduit overlap one another and a predetermined additional distance.

14. The brake master cylinder according to claim 10, further comprising:

a spring retainer, the radial projection extending from a front end portion of the spring retainer;

a rod having one end engageable with the spring retainer;

a rod engaging member fixed to a bottom of an internal bore opening formed at a forward portion of the first piston, the rod engaging member being engaged with an end of the rod that is opposite the one end;

a compressed spring positioned between the spring retainer and the rod engaging member; and the predetermined distance being equal to an axial moving distance of the radially extending projection from the rear end portion of the second piston to a rear end portion of the groove provided on the sleeve.

15. The brake master cylinder according to claim 10, further comprising:

a spring retainer having a front end portion at which is located the radial projection, the radial projection contacting a rear end portion of the second piston;

a rod having one end engageable with the spring retainer;

a rod engaging member fixed to a bottom of an internal bore opening formed at a forward portion of the first piston, an end of the rod opposite the one end being engaged with the rod engaging member;

a compressed spring positioned between the spring retainer and the rod engaging member; and the predetermined distance being equal to a moving distance of the radially extending projection from the rear end portion of the second piston to a rear stepped portion of a large diameter portion provided on a stepped internal bore of the cylinder housing.

* * * * *